(12) United States Patent
Pattini et al.

(10) Patent No.: US 10,810,474 B2
(45) Date of Patent: Oct. 20, 2020

(54) RADIO FREQUENCY IDENTIFICATION OF NANO/MICRO-ELECTRO-MECHANICAL MEASUREMENTS

(71) Applicant: Datalogic IP Tech S.r.l., Lippo di Calderara di Reno (IT)

(72) Inventors: Luca Pattini, Bologna (IT); Andrea Di Chele, Baranello (IT)

(73) Assignee: Datalogic IP Tech S.r.l., Lippo di Calderara di (IT)

( * ) Notice: Subject to any disclaimer, the term of this patent is extended or adjusted under 35 U.S.C. 154(b) by 0 days.

(21) Appl. No.: 16/237,334

(22) Filed: Dec. 31, 2018

(65) Prior Publication Data

US 2020/0210797 A1 Jul. 2, 2020

(51) Int. Cl.
*G06K 19/07* (2006.01)
*G06K 7/08* (2006.01)

(52) U.S. Cl.
CPC ......... *G06K 19/0717* (2013.01); *G06K 7/086* (2013.01); *G06K 19/0723* (2013.01)

(58) Field of Classification Search
CPC . G06K 19/0717; G06K 7/086; G06K 19/0723
USPC ........................................................ 235/492
See application file for complete search history.

(56) References Cited

U.S. PATENT DOCUMENTS

| | | | |
|---|---|---|---|
| 5,154,904 A | 10/1992 | Kleinschmit et al. | |
| 6,588,282 B2 | 7/2003 | Arms | |
| 6,622,567 B1 | 9/2003 | Hamel et al. | |
| 8,941,723 B2 | 1/2015 | Bentley et al. | |
| 9,349,049 B2 | 5/2016 | Bentley et al. | |
| 9,604,142 B2 | 3/2017 | Bentley et al. | |
| 2011/0163850 A1* | 7/2011 | Bachman | G06K 19/0702 340/10.1 |
| 2014/0152426 A1* | 6/2014 | Murphy | F16C 19/527 340/10.51 |
| 2017/0296868 A1 | 10/2017 | Bentley et al. | |
| 2019/0236435 A1* | 8/2019 | Spieth | G06M 1/083 |
| 2019/0299352 A1* | 10/2019 | Michiwaki | B23Q 5/04 |

* cited by examiner

*Primary Examiner* — Michael G Lee
*Assistant Examiner* — David Tardif
(74) *Attorney, Agent, or Firm* — Shook, Hardy & Bacon L.L.P.

(57) ABSTRACT

A sensor configured to detect and record measured conditions, such as temperature, pressure, volume, displacement, acceleration, and/or other measureable conditions. The sensor may incorporate radio frequency identification (RFID) components. The sensor may also incorporate micro-electro-mechanical devices and/or systems (MEMS) and/or nano-electro-mechanical devices and/or systems (NEMS) that are configured to change in response to certain conditions encountered by the MEMS/NEMS and provide indications of the same. The sensor may include a detector configured to detect the changes in the MEMS/NEMS. The detected changes may be stored by the MEMS and/or the NEMS and/or the RFID components, allowing information about the changes to be retrieved through a RFID reading and/or scanning process. The sensor may be used to monitor and/or track conditions associated with certain objects and/or environments, among other uses.

20 Claims, 10 Drawing Sheets

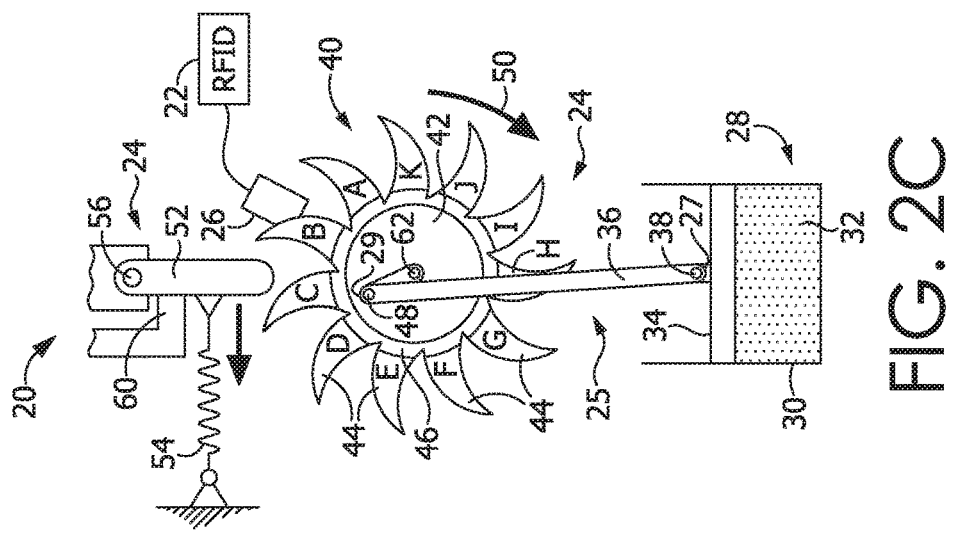
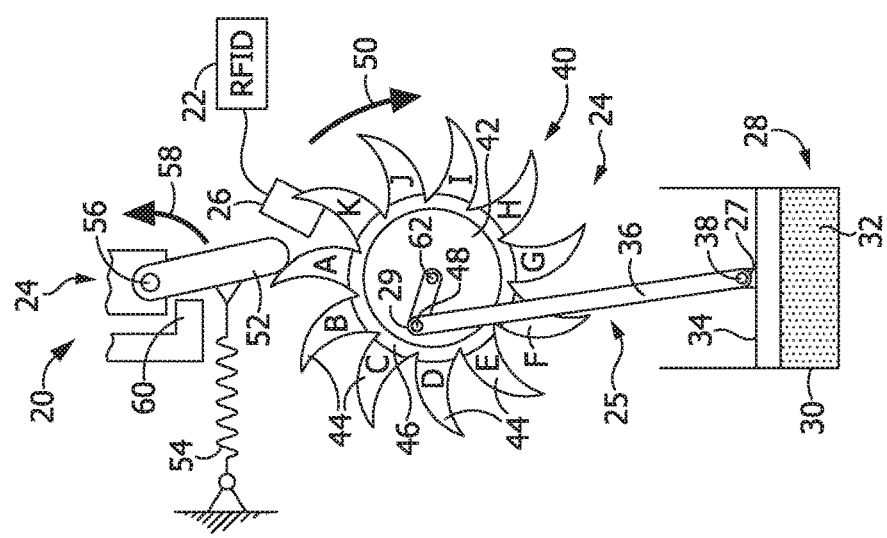
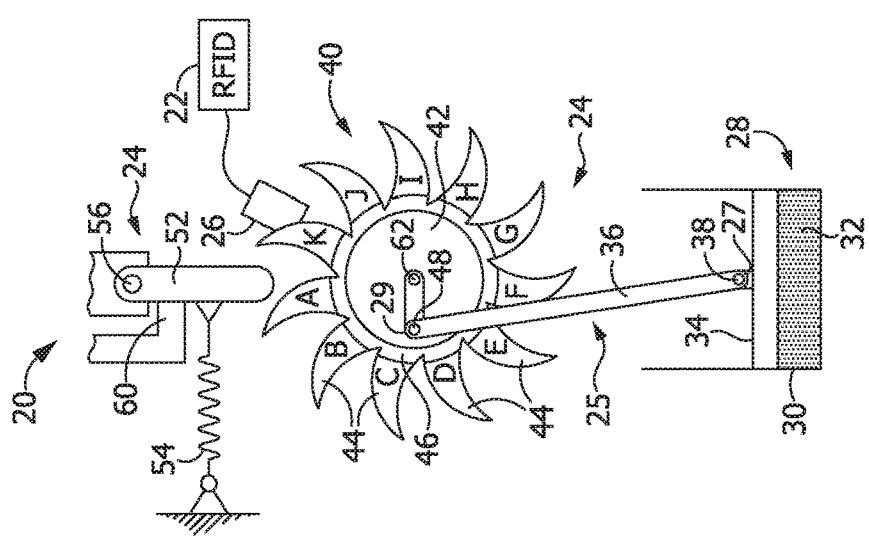

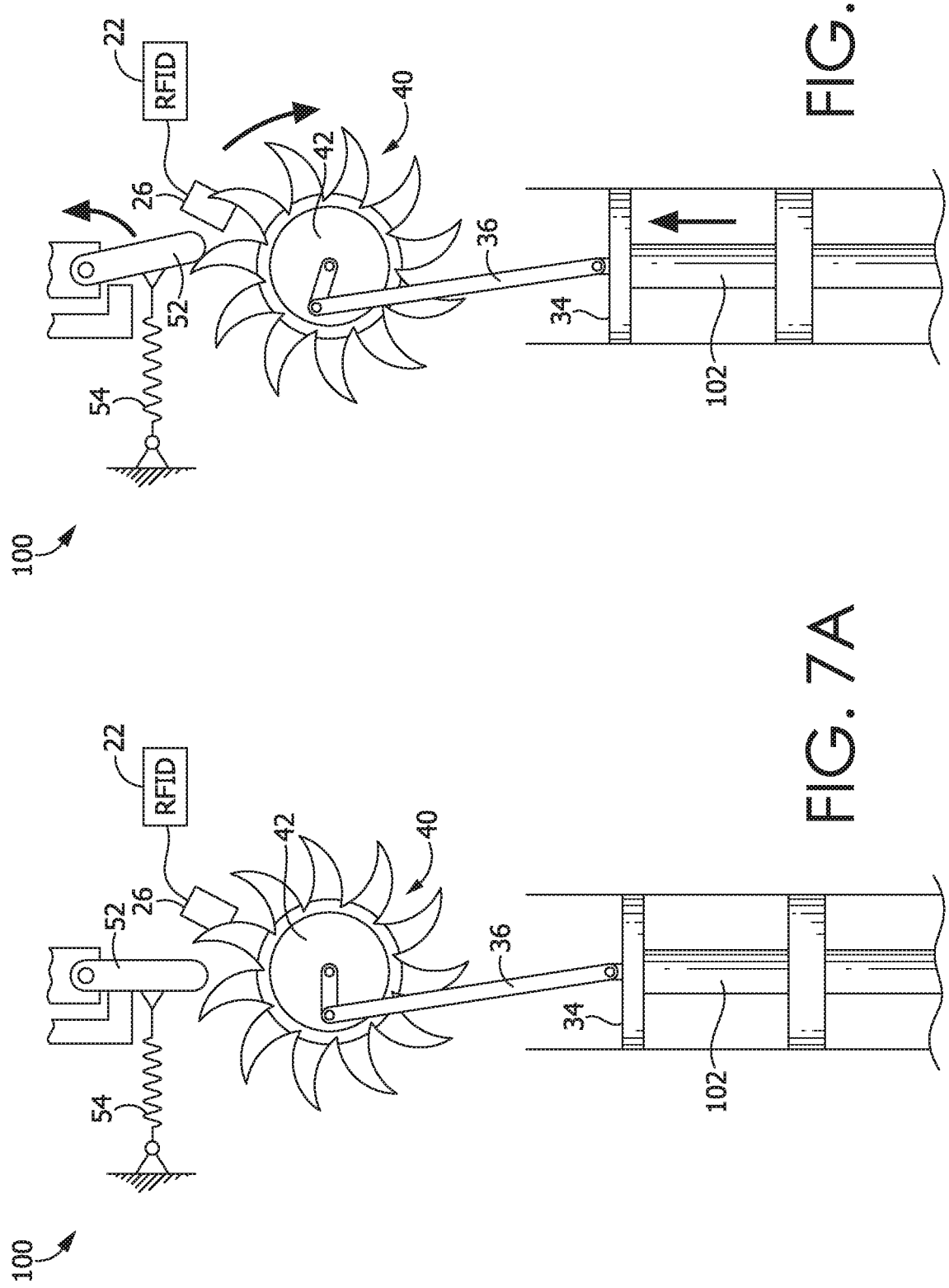

RADIO FREQUENCY IDENTIFICATION OF NANO/MICRO-ELECTRO-MECHANICAL MEASUREMENTS

TECHNICAL FIELD

The field relates to sensors, as well as use and manufacture of the same.

BACKGROUND

Sensors provide the ability to detect certain conditions of interest. For example, sensors may be used to detect conditions such as temperature, pressure, acceleration, deformation, and/or other conditions. Radio Frequency Identification (referred to herein as "RFID") is a technology that uses electromagnetic waves to read and capture information. RFID tags allow data to be electronically stored and then accessed through RFID reading and/or scanning. Micro-Electro-Mechanical Systems (referred to herein as "MEMS") is a technology that utilizes micro-scale mechanical and/or electro-mechanical components for different applications. Nano-Electro Mechanical Systems (referred to herein as "NEMS") is a technology that integrates miniaturized mechanical and/or electro-mechanical components on a nanoscale for different applications.

SUMMARY

This summary is provided to introduce a selection of concepts in a simplified form that are further described below in the detailed description section of this disclosure. This summary is therefore not intended to identify key or essential features of the claimed subject matter, nor is it intended to be used as an aid in determining the scope of the claimed subject matter.

In brief, and at a high level, this disclosure describes, among other things, sensors configured with RFID components and MEMS and/or NEMS components that allow the sensors to monitor and/or track conditions by detecting and recording changes in measurements. Measurements obtained by the MEMS and/or NEMS components in the sensors can be detected and then stored on a passive mechanical system associated with the MEMS and/or NEMS, and/or may be stored on the RFID components. The stored information can then be accessed through a RFID reading and/or scanning process which reads the mechanically stored and/or detected information and transmits it. Example conditions and measurements that can be monitored and/or tracked by such sensors include temperature, volume, pressure, acceleration, and/or deformation, among others.

The use of a sensor that incorporates RFID components and MEMS and/or NEMS components as described herein may realize numerous advantages. For example, relatively small-scale, low-power sensors utilizing the embodiments described herein can be used to monitor the conditions associated with certain objects and/or environments. For example, objects that require storage and/or transportation under controlled conditions may be monitored to determine if the conditions experienced by the objects exceed pre-defined parameters. As a further example, products such as pharmaceuticals, biologics, food products, etc., that require cold-chain tracking may be monitored to determine if a temperature of the products exceeds a level acceptable for use. Further, objects, devices, and/or environments that require certain operating conditions, including during certain processes, can be monitored and/or tracked using the embodiments described herein. The present technology therefore provides improved accuracy, consistency, and/or reliability in numerous monitoring and/or tracking applications.

In one embodiment of the present technology, a sensor adapted to provide RFID of a maximum detected measurement is provided. The sensor comprises a RFID tag and a MEMS and/or NEMS coupled to the RFID tag. The MEMS and/or NEMS comprises a measurement component, a measurement indicating component, and a mechanical coupling that couples the measurement component to the measurement indicating component, allowing a physical change in the measurement component to be at least partially translated to the measurement indicating component. The sensor further comprises a detector communicatively coupled to the RFID tag and configured to detect a change in the measurement indicating component. The MEMS and/or the NEMS and/or the RFID tag stores a maximum detected measurement from the measurement indicating component.

In another embodiment of the present technology, a sensor adapted to provide RFID of a maximum detected temperature is provided. The sensor comprises a RFID tag and a MEMS and/or NEMS coupled to the RFID tag. The MEMS and/or NEMS comprises a temperature responsive component comprising a bi-material strip that forms a coiled shape. The bi-material strip is formed at least from first and second strips of material having different coefficients of thermal expansion. The MEMS and/or NEMS further comprises a temperature indicating component and a mechanical coupling that couples the temperature responsive component to the temperature indicating component, allowing a physical change in the temperature responsive component caused by a change in temperature thereof to be at least partially translated to the temperature indicating component. The sensor further comprises a detector communicatively coupled to the RFID tag and configured to detect a change in the temperature indicating component. The MEMS and/or the NEMS and/or the RFID tag stores a maximum detected temperature from the temperature indicating component.

In another embodiment of the present technology, a sensor adapted to provide RFID of a maximum detected temperature is provided. The sensor comprises a RFID tag and a MEMS and/or NEMS coupled to the RFID tag. The MEMS and/or NEMS comprises a temperature responsive component comprising a bi-material strip. The bi-material strip is formed at least from first and second strips of material having different coefficients of thermal expansion. The MEMS and/or NEMS further comprises a temperature indicating component comprising a plurality of measurement indicators. The temperature responsive component and the temperature indicating component are positioned relative to each other such that when an increase in temperature occurs in the temperature responsive component, a resulting physical change in the temperature responsive component translates into contact with at least one of the measurement indicators. The sensor further comprises a detector communicatively coupled to the RFID tag and configured to detect when the temperature responsive component is in contact with one of the measurement indicators. The MEMS and/or the NEMS and/or the RFID tag stores a maximum detected temperature from the temperature indicating component.

BRIEF DESCRIPTION OF THE DRAWINGS

The present technology is described in detail herein with reference to the attached drawing figures, which illustrate non-limiting embodiments of the present technology, wherein:

FIG. 2A depicts a configuration of sensor components that enable RFID of measurements indicated by a MEMS, in accordance with an embodiment of the present technology;

FIG. 2B depicts the sensor components of FIG. 2A with the MEMS adjusting in response to a change in conditions, in accordance with an embodiment of the present technology;

FIG. 2C depicts the sensor components of FIGS. 2A and 2B with the MEMS indicating a different measurement, in accordance with an embodiment of the present technology;

FIGS. 7A and 7B depict an alternative configuration of sensor components that enable RFID of measurements indicated by a MEMS, such as displacement, pressure, and/or acceleration, in accordance with an embodiment of the present technology;

DETAILED DESCRIPTION

Figure 1:
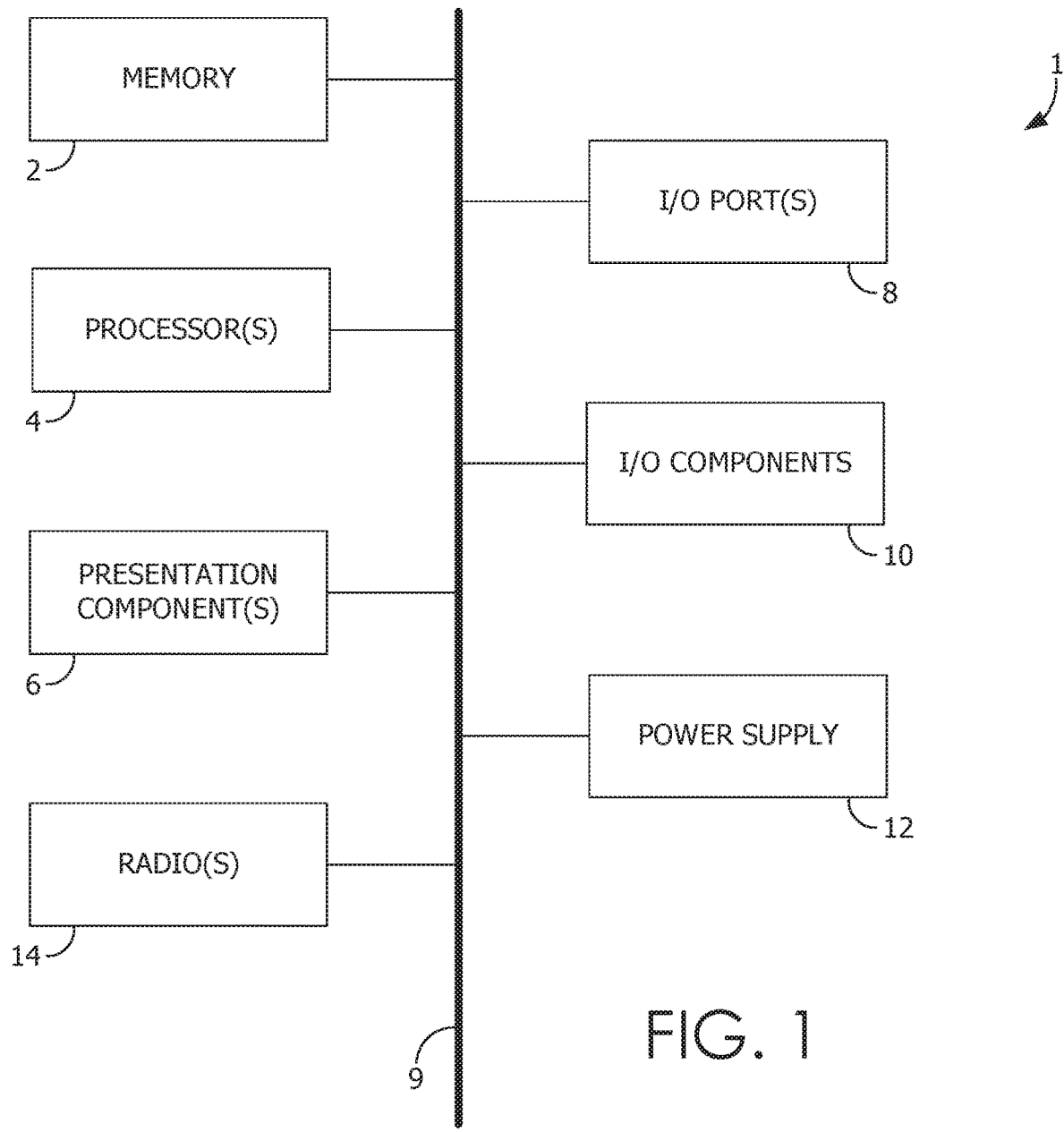
FIG. 1 depicts a computing system suitable for use with embodiments of the present technology.

The subject matter of this disclosure is described with specificity herein in order to meet statutory requirements. However, the description itself is not intended to limit the scope of the present technology. Rather, the claimed subject matter may be embodied in other ways, to include different elements, steps, and/or combinations of elements and steps, similar to those described in this disclosure, and in conjunction with other present or future technologies. Moreover, although the terms "step" and "block" may be used herein to connote different elements of various methods employed, the terms should not be interpreted as implying any particular order among or between various steps or blocks unless and except when the order of individual steps or blocks is explicitly described and required.

At a high level, the present technology relates to sensors, and more particularly to sensors adapted to detect certain measurements, and further, to sensors adapted to provide RFID of detected measurements that are obtained through feedback from a MEMS and/or a NEMS. These sensors, in certain disclosed aspects, provide relatively small-scale, low-powered, and/or passive components that can be used, for example, for monitoring conditions associated with objects and/or environments. For example, such a sensor can be used to monitor, depending on its configuration, the temperature, pressure, volume, acceleration, and/or displacement associated with the aforementioned objects and/or environments, and provide RFID of the same. The use of a passive mechanical system provided by a MEMS and/or a NEMS, and/or the use of RFID components, to store measurement data allows the measurement data to be accessed through RFID reading and/or scanning processes. Embodiments of the present technology related to the aforementioned sensors and processes are described in further detail below with reference to FIGS. 1-10C.

The present technology may be implemented, at least in part, as a method, a system, and/or a computer-program product. Accordingly, certain aspects disclosed herein may take the form of hardware, or may be represented as a combination of software and hardware, and/or may be represented as a computer-program that includes computer-useable instructions embodied on one or more computer-readable media. The subject matter hereof may also be implemented as hard-coded into the mechanical design of computing components and/or may be built at least partially into a sensor used for monitoring conditions in accordance with the embodiments described herein.

Computer-readable media may include volatile media, non-volatile media, removable media, and non-removable media, and may also include media readable by a database, a switch, and/or various other network devices. Network switches, routers, and related components are conventional in nature, as are methods of communicating using the same, and thus, further elaboration is not provided here. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Referring now to FIG. 1, a block diagram of an example computing device 1 suitable for enabling the operations and functions described in accordance embodiments presented herein is provided. It should be noted that although some components depicted in FIG. 1 are shown in the singular, they may be plural, and the components may be connected in a different, including distributed, configuration. For example, computing device 1 might include multiple processors and/or multiple radios. The computing device 1 shown in FIG. 1 includes a bus 9 that may directly or indirectly connect various components of the computing device 1 together, including memory 2, processor(s) 4, presentation component(s) 6 (if applicable), radio(s) 14, input/output (I/O) port(s) 8, input/output (I/O) component(s) 10, and power supply 12.

The memory 2 may take the form of any of the memory components described herein. Thus, further elaboration will not be provided here, but it is contemplated that memory 2 may include any type of tangible medium that is capable of storing information, such as a database. A database may include any collection of records, data, and/or other information. In one embodiment, memory 2 may constitute a set of computer-executable instructions that, when executed, facilitate various functions or steps associated with the subject matter described herein. These instructions will be referred to herein as "instructions" or an "application" for short. The processor(s) 4 shown in FIG. 1 may actually be multiple processors that may receive instructions and process them accordingly. The presentation component 6 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or even a lighted keyboard).

The radio(s) 14 may facilitate communication with a network, and may additionally or alternatively facilitate other types of wireless communications, such as Wi-Fi, WiMAX, LTE, Bluetooth, and/or VoIP communications, among other wireless communication protocols. In various aspects, the radio 14 may be configured to support multiple technologies, and/or multiple radios may be configured and utilized to support multiple technologies.

The input/output (I/O) ports 8 may take a variety of forms. Example I/O ports may include a USB jack, a stereo jack, an infrared port, a firewire port, and/or other proprietary communication ports. The input/output (I/O) components 10 may include one or more keyboards, microphones, speakers, touchscreens, and/or any other item useable to directly or indirectly input data into the computing device 1. The power supply 12 may include batteries, generators, fuel cells, and/or any other component that may act as a power source to supply power to computing device 1 and to any other sensor components described herein.

Turning now to FIGS. 2A-9, a variety of embodiments of sensors and sensor components associated with the present technology are provided. For the purposes of explanation and clarity, these sensors and sensor components are frequently depicted in partial, and/or schematic form, in order to highlight certain components and/or structures. It should be understood that the depicted arrangements of components may be adapted to fit or accommodate a particular sensor design and may include different and/or additional components necessary to complement the functions of such components and form a functioning sensor.

Referring now to FIGS. 2A-2C, a series of schematics depicting sensor components 20 that can be used to provide RFID of measurements obtained from a MEMS is provided, in accordance with an embodiment of the present technology. The sensor components 20 shown in FIGS. 2A-2C include a RFID component 22, a MEMS 24, and a detector 26. These components 22, 24, 26 may be incorporated at least partially into a sensor, such as for example the sensor 150 shown in FIG. 8, allowing the sensor to determine, for example, a maximum detected measurement of some suitable type. FIG. 2A depicts the sensor components 20 in an initial baseline state. FIG. 2B depicts the sensor components 20 with the MEMS 24 providing feedback based on a changing condition. FIG. 2C depicts the sensor components 20 with the MEMS 24 indicating a new maximum detected measurement.

The RFID component 22 shown in FIGS. 2A-2C may be a RFID tag, such as a passive, semi-passive, or active RFID tag. The RFID component 22 may further include an integrated circuit, memory, and/or antenna that allows for electromagnetic transmission of data stored on the RFID component 22 and/or on the associated MEMS 24 in its passive mechanical system. The RFID component 22 may further include a decoder that is powered through an antenna of the RFID component 22, allowing a measurement stored by the MEMS 24 in its passive mechanical system and/or on the RFID component 22 to be read by an RFID reader and/or scanner.

The MEMS 24 shown in FIGS. 2A-2C includes multiple components that are arranged to interact with one another. These components provide feedback based on changes in certain conditions. For the particular embodiment shown in FIGS. 2A-2C, the MEMS 24 is configured to change based on changes in temperature and also indicate a maximum achieved temperature. The detector 26 shown in FIGS. 2A-2C is configured so that it can detect temperature measurements, e.g., maximum temperature measurements, indicated by the MEMS 24. The detector 26 is communicatively coupled to the RFID component 22. This allows the detector 26 to communicate detected measurements to the RFID component 22 for transmission and/or storage thereon. The stored measurements, e.g., the maximum detected temperature, can then be accessed through a RFID reading and/or scanning process.

The MEMS 24 shown in FIGS. 2A-2C further includes a measurement component 28. As used herein, a measurement component, which may also be referred to herein as a measurement responsive component, generally represents a component or assembly of components that changes in response to certain conditions. For example, the measurement component 28 depicted in FIGS. 2A-2C is configured to produce a physical change based on a change in temperature of the measurement component 28. The MEMS 24 is configured so that this physical change in the measurement component 28 is translated at least partially to other components of the MEMS 24. This produces an indication that can be detected by the detector 26 and subsequently communicated to the RFID component 22 for transmission and/or storage thereon.

The measurement component 28 includes a fluid reservoir 30 and a movable piston 34. The fluid reservoir 30 includes a fluid 32 disposed therein. The movable piston 34 is arranged relative to the fluid reservoir 30 so that it at least partially encloses the fluid 32 within the fluid reservoir 30. The configuration of the MEMS 24 shown in FIGS. 2A-2C allows the fluid 32 disposed in the fluid reservoir 30 to change in volume as it changes in temperature. In other words, when the temperature of the fluid 32 changes, the fluid 32 expands or contracts, depending on whether the temperature increases or decreases, and thus the volume occupied by the fluid 32 in the fluid reservoir 30 changes. This volume change is enabled through movement of the piston 34.

FIGS. 2A, 2B, and then 2C depict a sequential increase in the temperature of the fluid 32 disposed in the fluid reservoir 30 and by association a sequential increase in the volume of the fluid 32 disposed in the fluid reservoir 30. The increase in temperature of the fluid 32 initially produces an increase in pressure within the fluid reservoir 30. This pressure increase imparts a force on the movable piston 34 that moves the piston 34 upward, which at least partially equalizes the pressure in the fluid reservoir 30 through an increase in the volume occupied by the fluid 32. Thus, in response to an increase in temperature of the fluid 32, the piston 34 moves upward. Similarly, when a temperature of the fluid 32 within the fluid reservoir 30 decreases, the volume of the fluid 32 decreases, translating into a downward force on the piston 34.

The measurement component 28, in addition to being responsive to changes in temperature of a static volume of fluid 32, may instead be configured to be responsive to a changing volume/quantity of fluid 32 present in the fluid reservoir 30. This changing volume/quantity of fluid may be caused by an ingress or egress of fluid into/out of the fluid reservoir 30. This ingress or egress of fluid may similarly translate into upward or downward movement of the piston 34. In other embodiments, the measurement component 28 may be configured so that the piston 34 is displaced by a force applied from something other than the fluid 32 (e.g., a movable column that is in contact with the piston 34 as shown in the embodiment depicted in FIGS. 7A and 7B). In still further embodiments, the measurement component 28 may be configured so that the piston 34 displaces due to acceleration of an object that is translated to the piston 34. These alternative configurations may be utilized with the MEMS 24 to allow changes in the measurement component 28 to be detected and stored on the MEMS 24 through its passive mechanical system and/or stored on the RFID component 22 as described herein.

Continuing with FIGS. 2A-2C, the MEMS 24 includes a mechanical coupling 25 that movably couples the measurement component 28 to a measurement indicating component 40 that forms part of the MEMS 24. The mechanical coupling 25 includes an elongated connecting rod 36 having a first end 27 and a second end 29. The first end 27 is movably coupled to the piston 34 with a movable and/or pivotal coupling 38. The second end 29 is movably coupled to the measurement indicating component 40 with a movable and/or pivotal coupling 48. The measurement indicating component 40 includes a circular gear 42. The circular gear 42 includes a plurality of teeth 44 spaced about a perimeter 46 of the circular gear 42. The movable and/or pivotal coupling 48 is located on the circular gear 42. In use, when the piston 34 translates, the first and second movable and/or pivotal couplings 38, 48 allow the connecting rod 36 to pivot relative to the circular gear 42 and the piston 34. This allows movement of the connecting rod 36 to be at least partially translated into rotational movement of the circular gear 42 as shown by the sequence depicted in FIGS. 2A, 2B, and then 2C.

The MEMS 24 shown in FIGS. 2A-2C is configured to indicate a maximum temperature achieved by the measurement component 28. This maximum temperature is determined based on which teeth 44 of the circular gear 42 are detected by the detector 26. The plurality of teeth 44 are labeled A-K. Each of the teeth 44 labeled one of A-K corresponds to a particular maximum temperature achieved by the measurement component 28. For example, the tooth labeled "A" corresponds to one maximum temperature achieved by the measurement component 28. The teeth labeled "B," "C," "D," etc., correspond to other maximum temperatures achieved by the measurement component 28 that are sequentially higher than the maximum temperature associated with the tooth labeled "A." In this sense, "A" corresponds to one maximum temperature achieved by the measurement component 28, "B" correspond to a higher maximum temperature achieved by the measurement component 28, "C" corresponds to yet an even higher maximum temperature achieved by the measurement component 28, and so on.

The MEMS 24 shown in FIGS. 2A-2C further includes a movable lever 52. The movable lever 52 is mounted on a pivot connection 56 and is coupled to a biasing mechanism 54. As shown in FIGS. 2A-2C, the lever 52 is movable between a resting position, shown in FIG. 2A, and a displaced position, shown in FIG. 2B. The biasing mechanism 54 is configured to resist movement of the lever 52 in the displacing direction (as indicated by the arrow 58 shown in FIG. 2B). Therefore, when the lever 52 is displaced as shown in FIG. 2B, the biasing mechanism 54 imparts a force on the lever 52, biasing it back towards the resting position, shown in FIG. 2A. The biasing mechanism 54 may utilize a spring as shown in FIGS. 2A-2C, or may utilize other components and/or structures for imparting the biasing force (e.g., the biasing mechanism 54 may instead utilize an elastic component, one or more magnet components, etc.). The MEMS 24 shown in FIGS. 2A-2C further includes a backstop 60. The backstop 60 is positioned so that the lever 52, when biased back to the resting position by the biasing mechanism 54, is maintained at the resting position, where it is suitably positioned for engaging the next advancing tooth 44 of the circular gear 42.

As discussed herein, the MEMS 24 is configured so that when the temperature of the measurement component 28 increases, the fluid 32 disposed in the fluid reservoir 30 increases in volume. This increase in volume translates into movement of the piston 34. The movement of the piston 34 translates into movement of the connecting rod 36. The movement of the connecting rod 36 imparts rotation to the circular gear 42 in the first rotational direction as indicated by the arrow 50 shown in FIG. 2C. This rotation of the circular gear 42 advances the teeth 44 in the first rotational direction causing one or more of the teeth 44 to sequentially move into contact with and displace the movable lever 52. As each tooth 44 contacts, and then displaces, the movable lever 52, the lever 52 is moved against the force of the biasing mechanism 54 until the tooth 44 advances past the movable lever 52 as shown in FIG. 2C. Once the tooth 44 has moved past the lever 52, the biasing mechanism 54 displaces the movable lever 52 back to the resting position against the backstop 60. Each tooth 44 that passes the lever 52 then advances towards the detector 26.

As shown in FIGS. 2A-2C, each tooth 44 of the circular gear 42 is shaped so that once it moves past the lever 52, it remains advanced past the lever 52 without reversing back to its original position on the opposite side of the lever 52. In other words, the teeth 44 can advance past the lever 52 in the first rotational direction, as indicated by the arrow 50 shown in FIG. 2B, but not in the opposite second rotational direction. This one-way advancement is accomplished through the shape of the teeth 44 in combination with the operation of the lever 52 and biasing mechanism 54. Such one-way advancement can also be accomplished through use of a one-way bearing mounted at the pivot coupling 62, which only allows the circular gear 42 to rotate in the first rotational direction and not in the opposite second rotational direction.

The rotational movement of the gear 42 imparted by the change in volume of the fluid 32 disposed in the fluid reservoir 30 advances the teeth 44 in a clockwise direction relative to FIGS. 2A-2C. As each tooth 44 sequentially advances past the movable lever 52 (e.g., "A," "B," and then "C"), a new maximum temperature of the measurement component 28 is indicated. Further, as each tooth 44 advances, the tooth 44 moves into position adjacent the detector 26. The detector 26 then detects the advanced tooth 44. For example, FIG. 2B shows the tooth labeled "A" advancing past the movable lever 52. FIG. 2C shows, after additional advancement, the tooth labeled "B" positioned adjacent to the detector 26 where the tooth labeled "B" is detected, thus indicating that the temperature measurement associated with the tooth labeled "B" is the new maximum temperature achieved by the measurement component 28. The detector 26, after detecting this, communicates this detected maximum temperature electronically to the RFID component 22 where the measurement information is stored and/or transmitted during an RFID reading and/or scanning process. The detector 26 may be configured to detect each advancing tooth 44 in a number of different ways. For example, in one contemplated embodiment, the detector 26 may be adapted to detect a change in at least one of capacitance, inductance, and/or resistance caused by the presence of a tooth 44, the movement of a tooth 44, and/or contact with a tooth 44. The detector 26 may detect specific teeth 44 (e.g., tooth "A," tooth "B," tooth "C," etc.) to determine the maximum temperature achieved by the measurement component 28 or may simply detect a number of teeth 44 that have rotationally advanced past the detector 26 to determine the same.

The MEMS 24 and the detector 26 are configured and/or calibrated so that a change in the measurement component 28 is translated to the measurement indicating component 40 in such a way that the detector 26 can accurately determine the indicated temperature. For example, the thermal expansion characteristics of the fluid 32, the dynamics of the mechanical components that translate movement through the MEMS 24, and the position of the detector 26, the lever 52, the teeth 44, etc., may be used to calibrate the detection system so that measurements that are indicated and detected accurately correspond to the temperature present in the measurement component 28.

It is also contemplated that multiple detectors may be used to detect measurements indicated by a MEMS, such as the MEMS 24 shown in FIGS. 2A-2C. Such detectors may be configured like the detector 26 described herein or may be configured differently. It is also contemplated that the detector 26 and/or any other detector may be positioned at any location about the circular gear 42 or otherwise integrated with the circular gear 42. For example, a detector may be positioned at the pivot center 62 of the circular gear 42 shown in FIGS. 2A-2C, where it can be used to detect rotation of the circular gear 42 that corresponds to a change in temperature of the measurement component 28. Further, in yet another alternative embodiment, a detector may be coupled to the movable lever 52, and may be used to detect displacement of the movable lever 52 to determine that teeth 44 have advanced past the detector 26, thus indicating that a new maximum temperature has been achieved by the measurement component 28. Any of the aforementioned detection elements and arrangements may be used to detect measurements indicated by a measurement indicating component as described herein.

The sensor components 20 shown in FIGS. 2A-2C may be configured differently to allow for detection of different types of measurements (e.g., temperature, pressure, displacement, acceleration, etc.). Therefore, the above-described configuration, which is adapted for maximum temperature detection, is provided as only one example of the configuration and use of the aforementioned sensor components, and others, are contemplated herein. Furthermore, the sensor components 20 shown in FIGS. 2A-2C may be integrated, at least partially, into a sensor and/or a housing thereof in actual implementation. For example, a sensor, such as the example sensor 150 shown in FIG. 8, may include the RFID component 22, the MEMS 24, and the detector 26 shown in FIGS. 2A-2C. The sensor components variously described herein may further be implemented into a chip, such as a silicon micro-chip, that is incorporated into and/or forms part of a sensor.

Figure 3C:
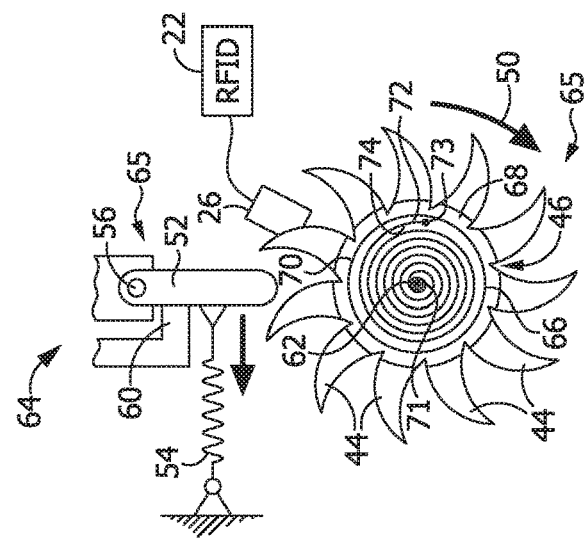
FIG. 3C depicts the sensor components of FIGS. 3A and 3B with the MEMS indicating a different measurement, in accordance with an embodiment of the present technology.
Figure 3B:
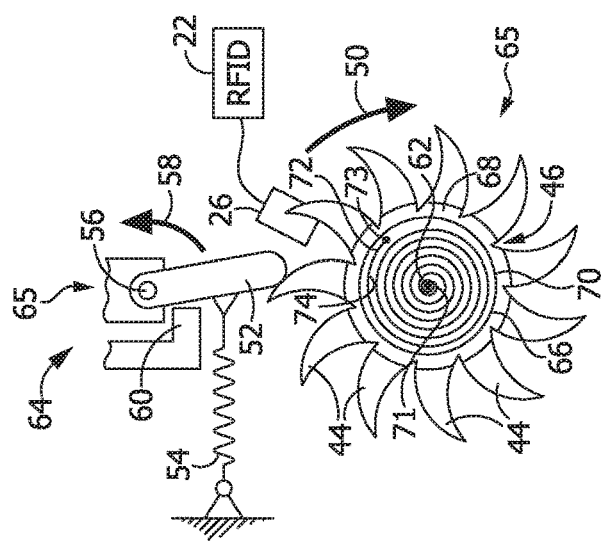
FIG. 3B depicts the sensor components of FIG. 3A with the MEMS adjusting in response to a change in conditions, in accordance with an embodiment of the present technology.
Figure 3A:
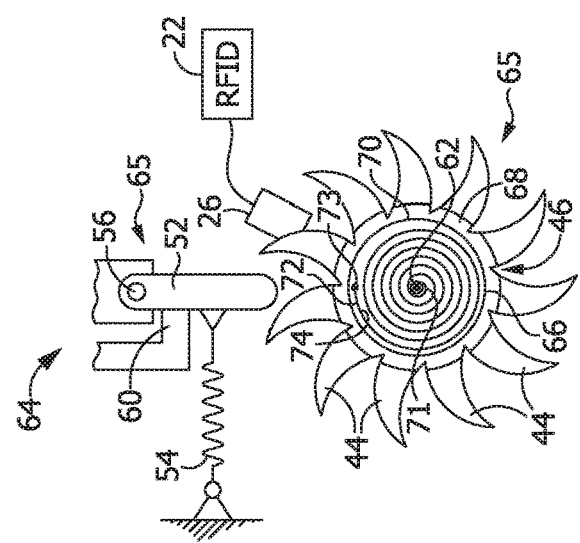
FIG. 3A depicts another configuration of sensor components that enable RFID of measurements indicated by a MEMS, in accordance with an embodiment of the present technology.

Referring now to FIGS. 3A-3C, a series of schematics depicting an alternative configuration of sensor components 64, which can be used to provide RFID of measurements indicated by a MEMS, are provided, in accordance with an embodiment of the present technology. The sensor components 64 include a MEMS 65. The MEMS 65 includes a measurement component 66 and a measurement indicating component 68. The sensor components 64 further include a number of components also provided with the measurement indicating component 40 depicted in FIGS. 2A-2C. For example, the sensor components 64 include the RFID component 22, the detector 26, the movable lever 52, the biasing mechanism 54 coupled to the movable lever 52, the backstop 60, and the circular gear 42 with the plurality of teeth 44 spaced about the perimeter 46 of the circular gear 42. However, the sensor components 64 shown in FIGS. 3A-3C also differ from the sensor components 20 shown in FIGS. 2A-2C in certain respects. Specifically, instead of the measurement component 28, which utilizes the fluid/piston/connecting rod assembly to impart movement to the circular gear 42, a different measurement component is used in the form of the measurement component 66 that constitutes a bi-material strip of material 70. The bi-material strip 70 is shown in FIGS. 3A-3C, and also in FIGS. 4A and 4B, and is described further below.

The bi-material strip 70 forms a coiled shape and is responsive to changes in temperature, and may be thought of as a coiled spring. The bi-material strip 70 includes at least a first strip of material 72 and a second strip of material 74 that are coupled together. The first and second strips of material 72, 74 may be coupled together proximate corresponding ends of the first and second strips of material 72, 74, and/or substantially along the entire length of the first and second strips of material 72, 74, in various embodiments. The first strip of material 72 is selected to have a first coefficient of thermal expansion, and the second strip of material 74 is selected to have a second coefficient of thermal expansion that is different than the first coefficient of thermal expansion. This composite design allows the first and second strips of material 72, 74 to expand and contract at different rates when the temperature of the bi-material strip 70 changes. This allows the temperature change to be converted into mechanical displacement. For the purposes of this description, a "bi-material strip" shall mean a strip that includes at least two materials having different coefficients of thermal expansion which are attached together. In other words, a "bi-material strip" as stated herein includes two materials having different coefficients of thermal expansion, but might also include additional materials. The material used to form the bi-material strip 70 and the strips of material 72, 74 thereof may be metal, such as copper, aluminum, or brass, and/or may be other thermally conductive materials including both metals and non-metals.

The bi-material strip 70 includes a first end 71 coupled at the pivot center 62 of the gear 42 and a second end 73 coupled to the gear 42 at a location between the pivot center 62 and the perimeter 46, as shown in FIGS. 3A-3C. The bi-material strip 70 and the gear 42 are assembled/coupled so that the first strip of material 72, which has a higher coefficient of thermal expansion and therefore realizes more mechanical displacement in response to changes in temperature compared to the second strip of material 74, is positioned on the outward side of the bi-material strip 70, i.e., facing away from the pivot center 62 of the gear 42, as shown in FIGS. 3A-3C. As a result, when the bi-material strip 70 experiences an increase in temperature, the shape of the bi-material strip 70 changes thereby imparting a rotational force to the circular gear 42 as indicated by the arrow 50 shown in FIG. 3B. Like the MEMS 24 shown in FIGS. 2A-2C, the force imparted on the gear 42 by the bi-material strip 70 after an increase in temperature causes the gear 42 to advance in the first rotational direction as shown by the arrow 50 depicted in FIG. 3B. This advances the teeth 44 towards the lever 52 and the detector 26. As the teeth 44 advance into contact with the movable lever 52, they displace the movable lever 52 against the force of the biasing mechanism 54 as shown in FIG. 3B. As each tooth 44 advances fully past the movable lever 52, the biasing mechanism 54 biases the movable lever 52 back to the resting position against the backstop 60 as shown in FIG. 3A. Each tooth 44, after advancing past the lever 52, moves into proximity of the detector 26, where the tooth 44 can be detected as described with respect to FIGS. 2A-2C.

Each time a tooth 44 is detected by the detector 26, the detection is communicated to the RFID component 22. The RFID component 22 then transmits and/or stores the temperature corresponding to the detected tooth 44 as the highest temperature indicated and/or stored by the MEMS 65. Like the component configuration shown in FIGS. 2A-2C, the teeth 44 of the gear 42 are shaped so that the teeth 44 can advance past the lever 52 in the first rotational direction as shown by the arrow 50 in FIG. 3B, but not in the opposite second rotational direction. This one-way configuration allows the maximum temperature indicated by the measurement indicating component 68 to be maintained even if the temperature of the bi-material strip 70 decreases.

Figure 4A:
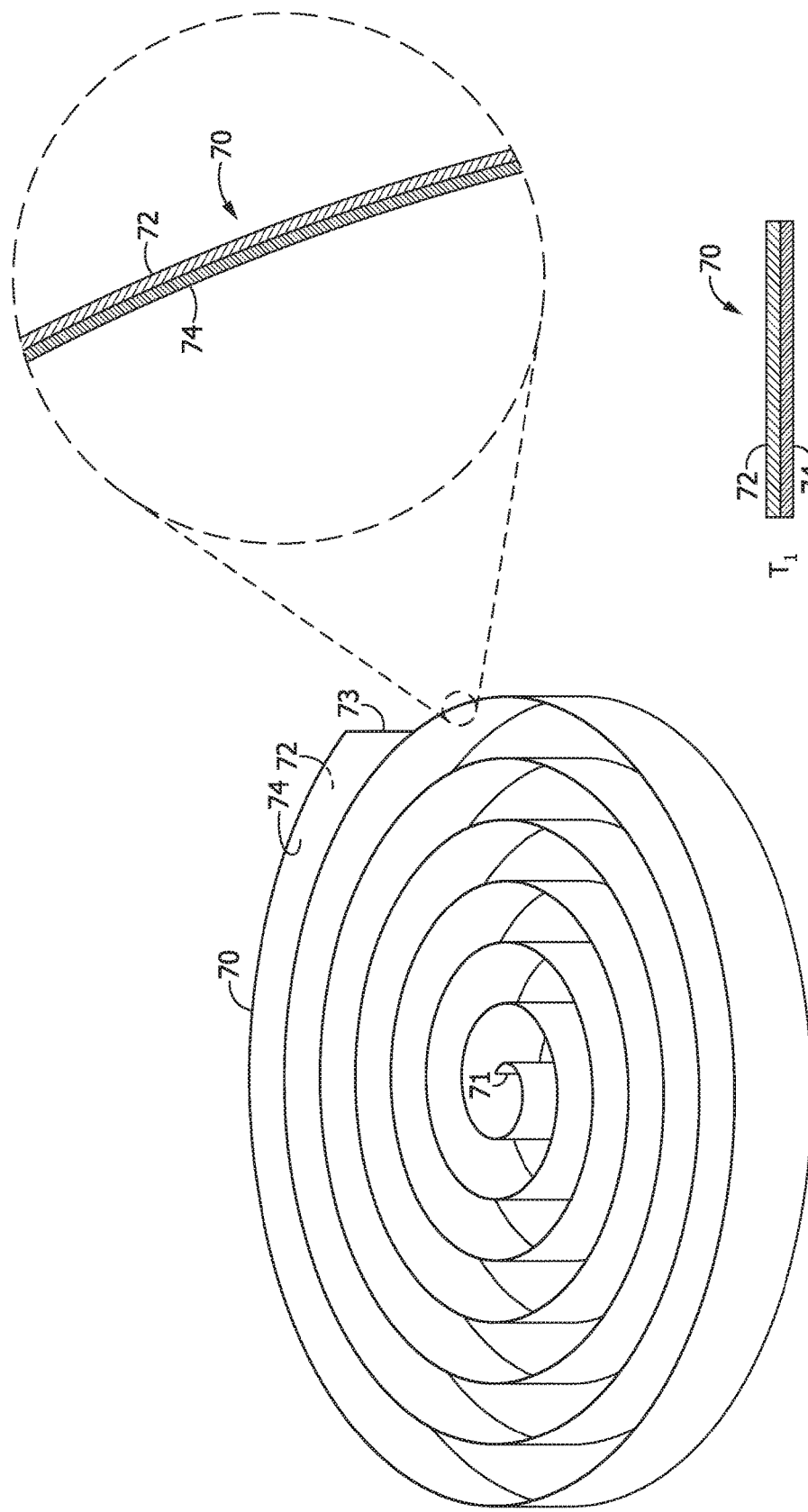
FIG. 4A depicts a coiled bi-material strip that may form part of a measurement component associated with the MEMS shown in FIGS. 3A-3C, in accordance with an embodiment of the present technology.
Figure 4B:
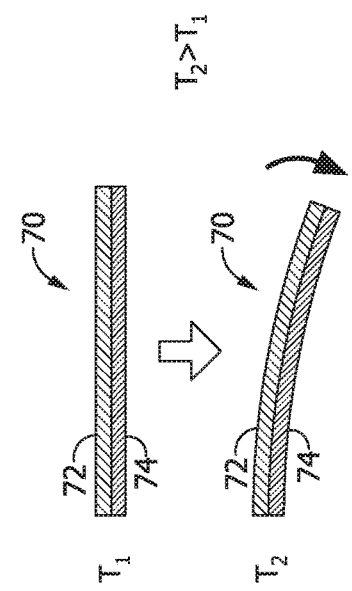
FIG. 4B depicts a portion of the bi-material strip depicted in FIG. 4A mechanically displacing in response to a change in temperature, in accordance with an embodiment of the present technology.

Referring now to FIG. 4A, an angled perspective view of the bi-material strip 70 discussed with respect to FIGS. 3A-3C is shown, in accordance with an embodiment of the present technology. As discussed above, the bi-material strip 70 includes a first end 71 that can be attached to the center of a circular gear, such as the pivot center 62 of the circular gear 42 shown in FIGS. 3A-3C, and a second end 73 that can be attached to the circular gear at a location between the center and a perimeter of the circular gear, such as the attachment location shown in FIGS. 3A-3C. The first strip of material 72, which has a higher coefficient of thermal expansion, is located on a side of the bi-material strip 70 that faces away from a center of the coiled shape formed by the bi-material strip 70. The second strip of material 74, which has a lower coefficient of thermal expansion, is located on a side of the bi-material strip 70 that faces towards the center of the coiled shape formed by the bi-material strip 70. FIG. 4B shows how a change in temperature of the bi-material strip 70 results in differing rates of thermal expansion between the first strip of material 72 and the second strip of material 74, which causes mechanical displacement of the bi-material strip 70 that can be imparted to the circular gear 42 shown in FIGS. 3A-3C, causing rotation thereof. As shown in FIG. 4B, once the temperature increases (e.g., $T_1$ is increased to $T_2$), mechanical displacement occurs generally in the lateral direction.

Figure 5A:
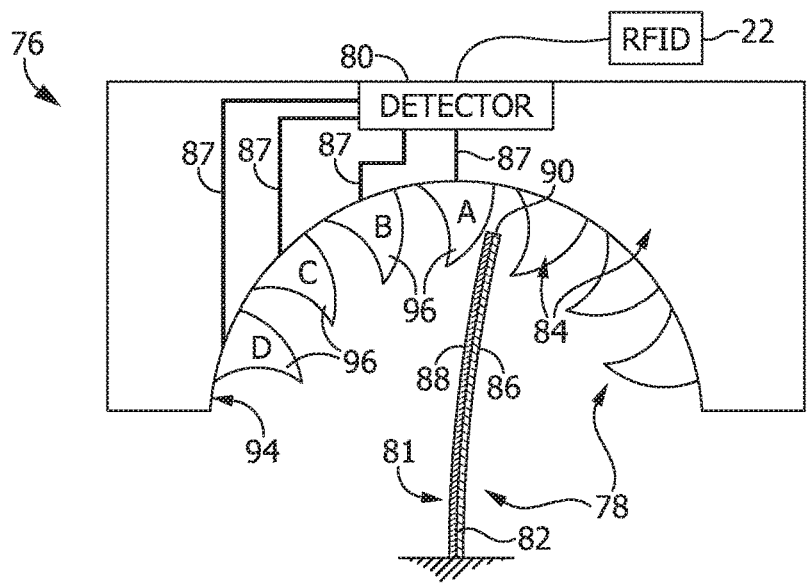
FIG. 5A depicts a configuration of sensor components that enable RFID of measurements indicated by a MEMS, in accordance with an embodiment of the present technology.
Figure 5B:
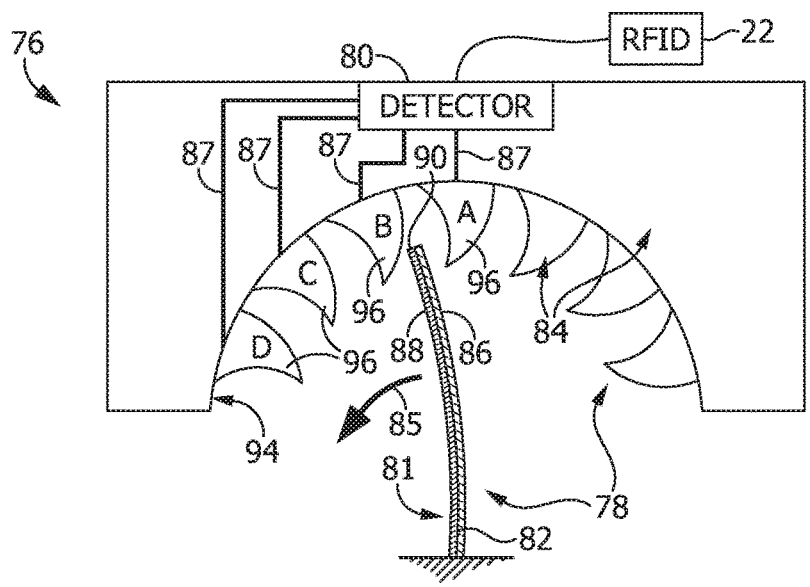
FIG. 5B depicts the sensor components of FIG. 5A with the MEMS adjusting in response to a change in conditions, in accordance with an embodiment of the present technology.
Figure 5C:
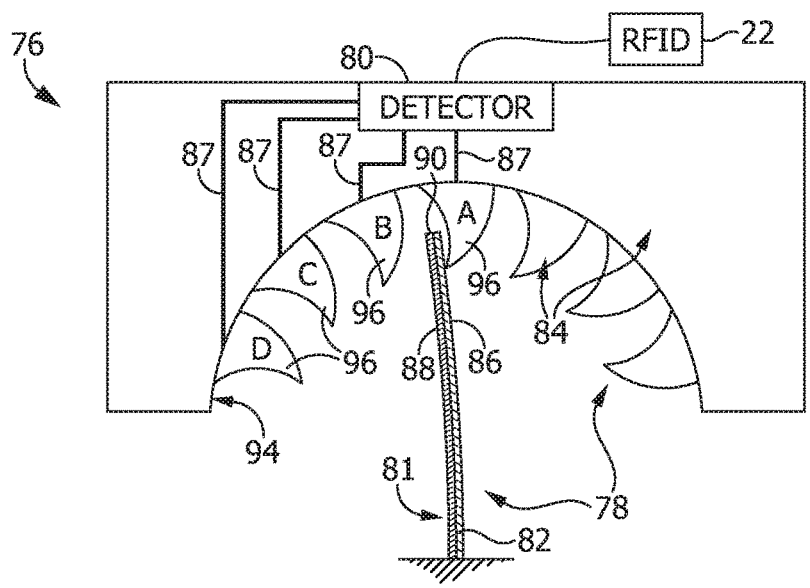
FIG. 5C depicts the sensor components of FIGS. 5A and 5B with the MEMS indicating a different measurement, in accordance with an embodiment of the present technology.

Referring now to FIGS. 5A-5C, a series of schematics depicting another alternative configuration of sensor components 76 that can be used to provide RFID of measurements indicated and/or stored by a MEMS is provided, in accordance with an embodiment of the present technology. FIGS. 5A-5C show a configuration that includes a MEMS 78, a RFID component 22, and a detector 80. The MEMS 78 includes a temperature component 81, which is provided as a bi-material strip 82 that is responsive to changes in temperature, and the MEMS 78 also includes a temperature indicating component 84, which is configured to indicate a maximum temperature achieved by the temperature component 81. The bi-material strip 82 may be similar to the bi-material strip 70 described and shown with respect to FIGS. 3A-3C and FIGS. 4A and 4B. However, in contrast to the bi-material strip 70 shown in FIGS. 3A-3C and FIGS. 4A and 4B, the bi-material strip 82 shown in FIGS. 5A-5C has a more linear configuration suitable for providing temperature indications through interaction with the temperature indicating component 84, as discussed in greater detail below.

The bi-material strip 82, like the bi-material strip 70 shown in FIGS. 3A-3C, includes a first strip of material 86 and a second strip of material 88 that are formed of materials having different coefficients of thermal expansion. This allows a change in temperature of the bi-material strip 82 to cause mechanical displacement as discussed above. The first strip of material 86, which is selected to have a higher coefficient of thermal expansion compared to the second strip of material 88, is positioned so that with an increase in temperature of the bi-material strip 82, a higher thermal expansion occurs in the first strip of material 86 that causes the bi-material strip 82 to bend from right to left as shown by the arrow 85 in FIG. 5B. The bi-material strip 82 includes a distal portion 90 that moves depending on this displacement, causing interaction with elements of the temperature indicating component 84 as described below.

The temperature indicating component 84 includes features that are positioned to allow interaction with the temperature component 81, and specifically, with the distal portion 90 of the bi-material strip 82. The temperature indicating component 84 includes a curved surface 94 having a plurality of measurement indicators 96 positioned along the curved surface 94. In the embodiment depicted in FIGS. 5A-5C, the measurement indicators 96 are represented as a plurality of teeth similar to those spaced along the perimeter 46 of the gear 42 depicted in FIGS. 2A-2C and FIGS. 3A-3C. Each of the measurement indicators 96 shown in FIGS. 5A-5C is coupled to the detector 80, so that when there is contact between the distal portion 90 of the bi-material strip 82 and one of the measurement indicators 96, a circuit is closed (e.g., one of the circuits 87), causing indication of a maximum temperature reached by the temperature component 81. This indication can be communicated to the RFID component 22 and/or stored by the MEMS 78 and/or the RFID component 22.

FIG. 5A depicts the sensor components 76 while the MEMS 78 is in a baseline configuration, with no increase in temperature having been experienced by the bi-material strip 82. FIG. 5B depicts the sensor components 76 after the bi-material strip 82 has been exposed to an increase in temperature, which causes the first strip of material 86 and the second strip of material 88 to experience thermal expansion at different rates, causing mechanical displacement of the distal portion 90 of the bi-material strip 82. This mechanical displacement moves/bends the bi-material strip 82 to the left, i.e., counter-clockwise relative to the orientation of the sensor components 76 depicted in FIGS. 5A-5C. This movement/bending of the bi-material strip 82 caused by the increase in temperature advances the distal portion 90 of the bi-material strip 82 into contact with one of the measurement indicators 96. More specifically, as shown in FIG. 5B and FIG. 5C, the temperature increase and resulting mechanical displacement of the bi-material strip 82 moves the distal portion 90 of the bi-material strip 82 past the tooth labeled "A," after which the distal portion 90 rests in contact with the tooth labeled "A," completing the circuit between the tooth labeled "A" and the detector 80 thereby indicating that the temperature corresponding to the tooth labeled "A" corresponds to the highest temperature reached by the bi-material strip 82. This maximum temperature reading is then communicated to the RFID component 22 and/or stored by the MEMS 78 and/or the RFID component 22.

Like the teeth 44 of the gear 42 shown in FIGS. 2A-2B and FIGS. 3A-3C, the measurement indicators 96 are shaped such that the distal portion 90 of the bi-material strip 82 can advance past each measurement indicator 96 in a first rotational direction, as indicated by the arrow 85 shown in FIG. 5B, but not in an opposite second rotational direction. This allows the highest temperature achieved by the temperature component 81 to be recorded and maintained. The measurement indicators 96 shown in FIGS. 5A-5C that are labeled "A," "B," "C," etc., each represent temperatures achieved by the temperature component 81 (e.g., "A" represents one maximum temperature, "B" represents a higher maximum temperature, "C" represents an even higher maximum temperature, etc.). Accordingly, as the temperature of the bi-material strip 82 increases, and the distal portion 90 moves as indicated by the arrow 85 into sequential contact with the measurement indicators 96, new maximum achieved temperatures are detected by the detector 80 as described further below.

In the embodiment depicted in FIGS. 5A-5C, the detector 80 determines the maximum temperature achieved by the temperature component 81 based on contact between the distal portion 90 of the bi-material strip 82 and the measurement indicators 96 (i.e., temperature indicators 96). Each time there is contact between the distal portion 90 and one of the measurement indicators 96, one of a plurality of closeable circuits 87 integrated into the components of the MEMS 78 is closed, which signals to the detector 80 that a maximum temperature has been achieved by the temperature component 81. The bi-material strip 82 shown in FIGS. 5A-5C forms a first portion of the plurality of closeable circuits 87. Each of the plurality of measurement indicators 96 respectively forms a second portion of the plurality of closeable circuits 87. Therefore, when the temperature of the bi-material strip 82 increases, and the distal portion 90 moves/bends in response, as shown for example in FIG. 5B, the distal portion 90 of the bi-material strip 82 can advance past one of the measurement indicators 96, as shown for example in FIG. 5B, making contact with the measurement indicator 96 in the process. This contact closes one of the circuits 87 as shown in FIG. 5C. The closed circuit now indicates the maximum temperature achieved by the temperature component 81. The completion of the circuit is detected by the detector 80 and communicated to the RFID component 22. Further, even if the temperature of the bi-material strip 82 decreases, the recording of maximum temperature remains as shown in FIG. 5C due to the one-way movement provided for the temperature component 81.

Figure 6B:
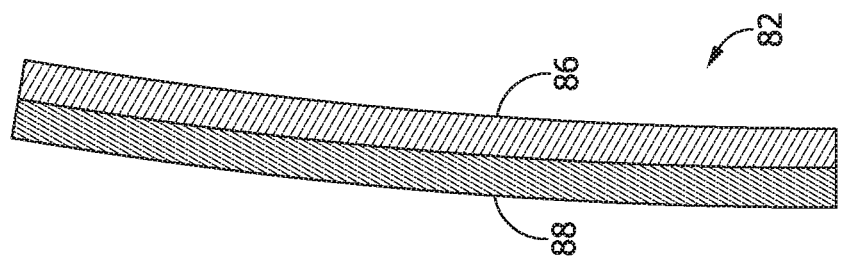
FIGS. 6A and 6B depict a bi-material strip that forms part of the MEMS shown in FIGS. 5A-5C, in accordance with an embodiment of the present technology.
Figure 6A:
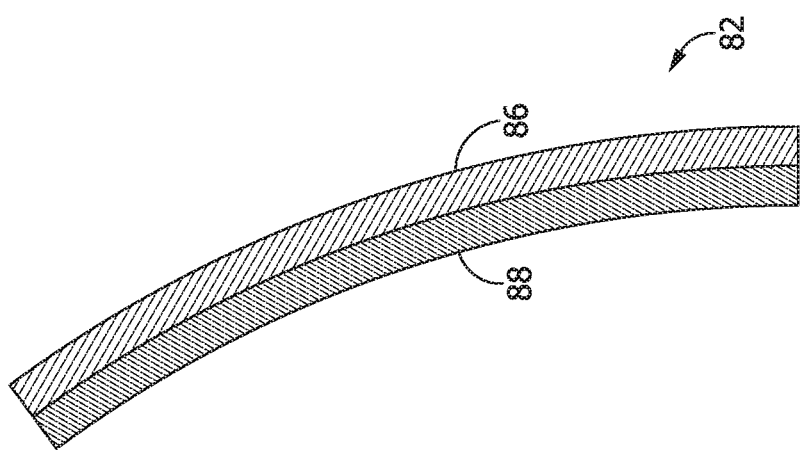

Referring now to FIGS. 6A and 6B, part of the bi-material strip 82 shown in FIGS. 5A-5C is depicted in isolation, in accordance with an embodiment of the present technology. FIGS. 6A and 6B depict the construction of the bi-material strip 82 and namely the assembled first and second strips of material 86, 88 that have different coefficients of thermal expansion. FIG. 6A depicts the bi-material strip 82 in an initial, baseline temperature state as depicted in FIG. 5A. FIG. 6B depicts the bi-material strip 82 after being exposed to an increase in temperature that causes mechanical displacement, corresponding generally to the state of the bi-material strip 82 shown in FIG. 5B.

Referring now to FIGS. 7A and 7B, an alternative configuration of sensor components 100 that incorporates RFID components and MEMS components used to detect measurements related to volume, displacement, pressure, and/or acceleration, depending on the configuration, is provided, in accordance with embodiments of the present technology. The configuration of sensor components 100 shown in FIGS. 7A and 7B is similar to the configuration shown in FIGS. 2A-2C, but instead of the enclosed fluid reservoir 30 with the fluid 32 disposed therein that moves the piston 34 in response to changes in temperature of the fluid 32, the movable piston 34 is mechanically coupled to a movable column 102. The movable column 102 may be configured to shift in response to a change in volume of a fluid column, or alternatively may be configured to shift in response to a change in pressure or volume of a gas. The movable column 102 may also be configured to shift in response to displacement of an object coupled to the movable column 102. The movable column 102 may also be configured to shift in response to an acceleration imparted to the movable column 102, such as by a moving/accelerating object. In each case, the movement of the column 102 translates to the other components of the MEMS that indicate measurements and/or maximum measurements associated with such forces. The RFID component 22, the detector 26, and the depicted MEMS components, e.g., the elongated connecting rod 36, the circular gear 42, and the movable lever 52, and the biasing mechanism 54 shown in FIGS. 7A and 7B may operate similarly as those elements described with respect to FIGS. 2A-2C and FIGS. 3A-3C in the sense that measurements translated from the moving column 102 to the other MEMS components can be detected, communicated to the RFID component 22, and stored by the MEMS in its passive mechanical system and/or by the RFID component 22 for later access through an RFID reading and/or scanning process as described herein.

Figure 8:
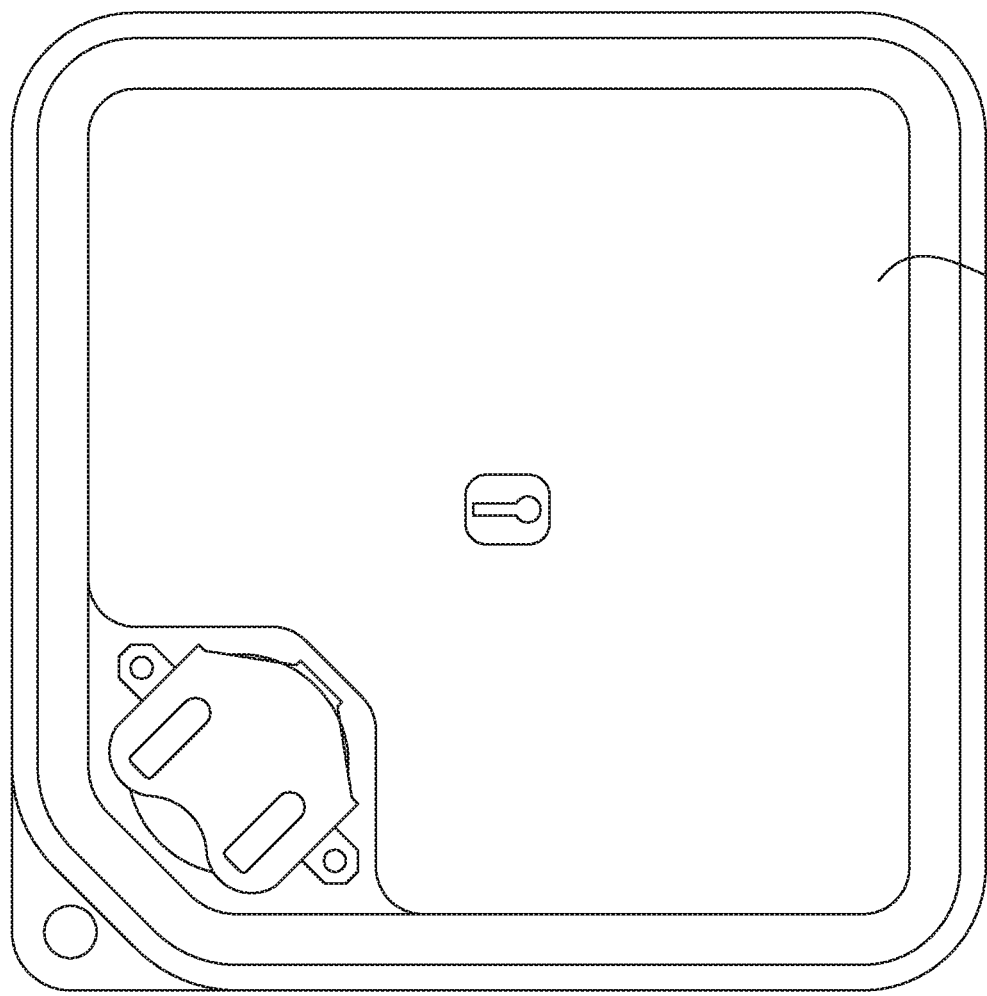
FIG. 8 depicts an example of a sensor suitable for incorporating embodiments of the present technology.

Referring to FIG. 8, an example of a sensor 150 suitable for incorporating embodiments of the present technology is depicted. The sensor 150 includes a housing 152. The MEMS components and/or NEMS components, RFID components, and/or detector components described herein may be at least partially incorporated into the sensor to provide the measurement tracking functions and capabilities described herein. The sensor 150 may be configured so that its measurement tracking functions can be selectively activated, and/or deactivated, allowing the functions to be used at a desired time and/or place and/or in a desired circumstance.

Figure 9:
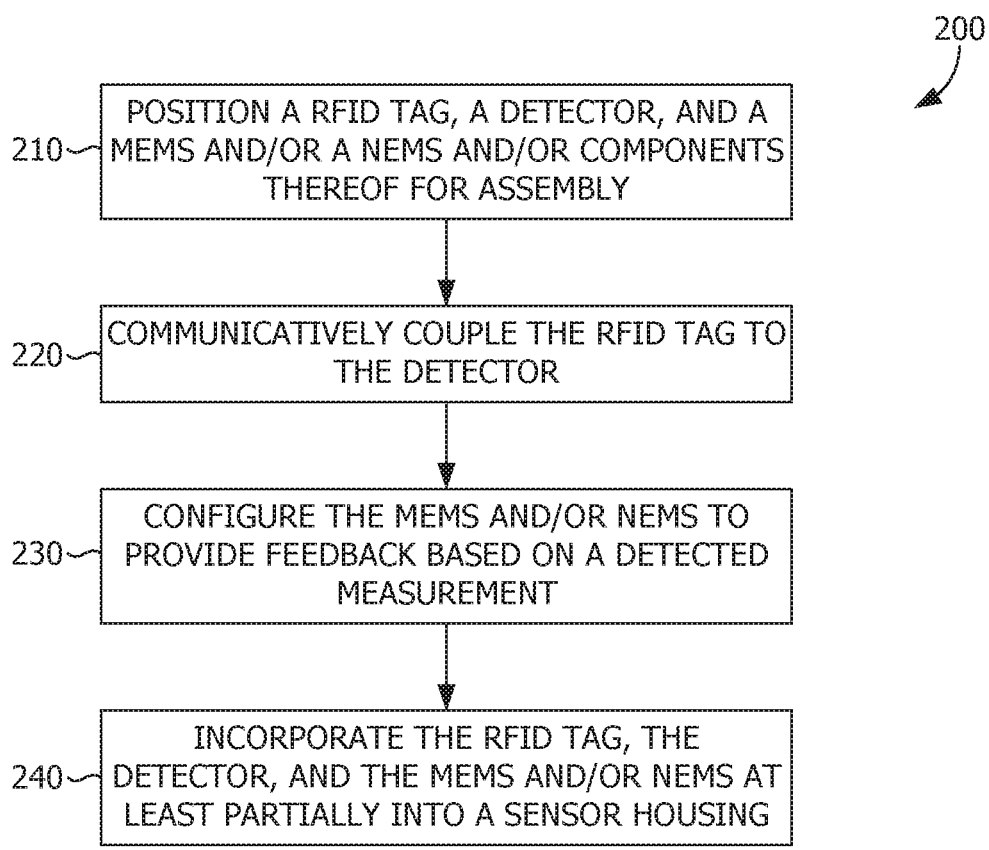
FIG. 9 depicts a block diagram of an example method of manufacturing and/or assembling a sensor that utilizes RFID components and MEMS and/or NEMS components as described herein, in accordance with embodiments of the present technology.

Referring now to FIG. 9, a block diagram of an example method 200 of manufacturing and/or assembling a sensor adapted to provide RFID of measurements indicated by a MEMS and/or NEMS is provided, in accordance with an embodiment of the present technology. The sensor may be assembled to include a RFID component, such as a RFID tag, a MEMS and/or NEMS, and a detector adapted to detect feedback provided by the MEMS and/or NEMS. With continued reference to FIG. 9, at block 210, a RFID tag, a detector, and a MEMS and/or NEMS and/or components thereof are positioned for assembly. At block 220, the RFID tag is communicatively coupled to the detector. At block 230, the MEMS and/or NEMS is configured to provide feedback based on a detected measurement, such as temperature, pressure, volume, acceleration, etc., as described herein. At block 240, the RFID tag, the detector, and the MEMS and/or NEMS are incorporated at least partially into a housing of the sensor. The assembled sensor may, in contemplated embodiments, be configured so that the components that provide the monitoring functions described herein only function when the sensor and/or the components thereof, e.g., the MEMS and/or the NEMS components, are activated for use. This may be accomplished through mechanical activation (e.g., a movable mechanism), electrical activation (e.g., activating of power), and/or chemical activation (e.g., initiating a chemical reaction that activates the functionality of the sensor components). This selective activation can allow the monitoring characteristics of the sensor to be activated and used under desired circumstances. The activation of the sensor components may be made irreversible to prevent manipulation and/or reduce potential errors in the tracking process.

Figure 10A:
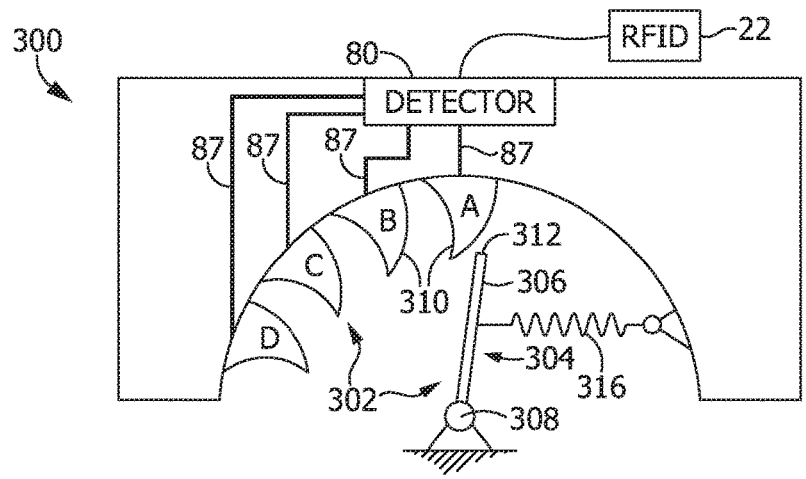
FIG. 10A depicts a configuration of sensor components that enable RFID of measurements indicated by a MEMS, in accordance with an embodiment of the present technology.
Figure 10B:
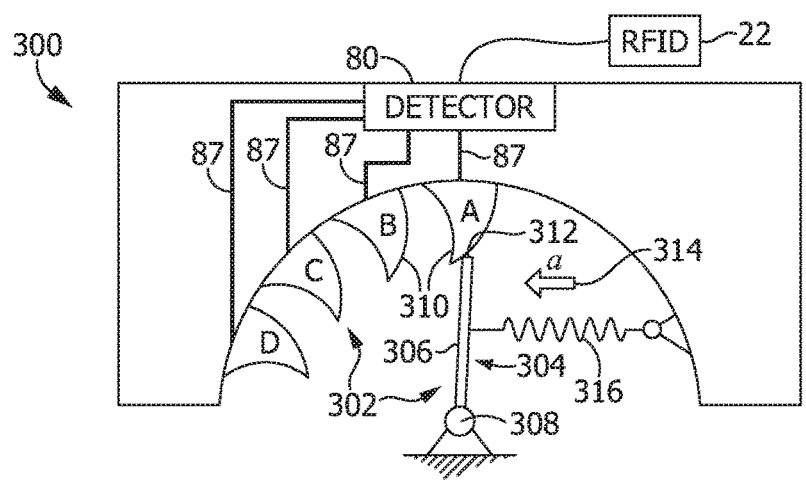
FIG. 10B depicts the sensor components of FIG. 10A with the MEMS adjusting in response to a change in conditions, in accordance with an embodiment of the present technology.
Figure 10C:
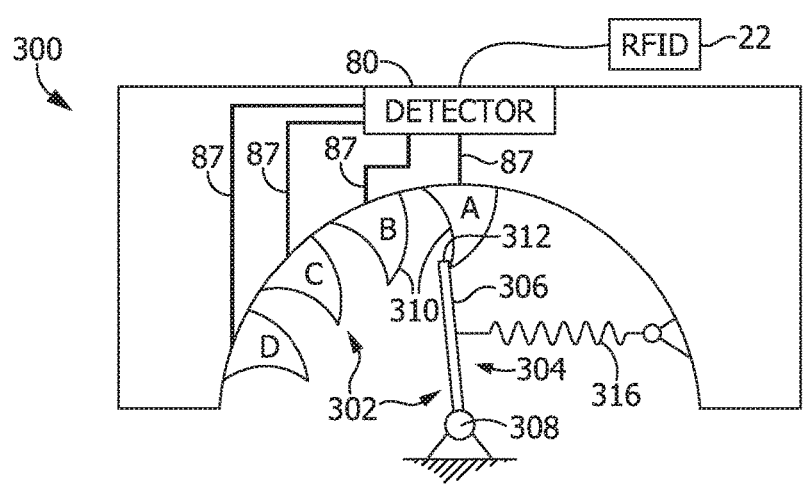
FIG. 10C depicts the sensor components of FIGS. 10A and 10B with the MEMS indicating/storing a new maximum measurement, in accordance with an embodiment of the present technology.

Referring now to FIG. 10A, another alternative configuration of sensor components 300 that enable RFID of measurements indicated and/or stored by a MEMS is provided, in accordance with an embodiment of the present technology. FIGS. 10A-10C depict a configuration of sensor components similar to that shown in FIGS. 5A-5C, but instead, the sensor components 300 are configured to detect, store, and transmit through RFID a maximum detected acceleration. Like the configuration shown in FIGS. 5A-5C, the sensor components 300 include a MEMS 302, a detector 80, and a RFID component 22 which are arranged so that acceleration measurements indicated and/or stored by the MEMS 302 can be transmitted through RFID. The MEMS 302 includes a measurement component 304 represented as an elongated member 306 that is attached to a pivotal coupling 308. The MEMS 302 further includes a measurement indicating component 310 that includes a plurality of teeth labeled A-D as shown in FIGS. 10A-10C. The plurality of teeth A-D are shaped to allow a distal portion/distal end 312 of the measurement component 304 to advance past the teeth in a first rotational direction as shown by the arrow 314 depicted in FIG. 10B but not in an opposite second rotational direction. This allows components of the MEMS 302 to mechanically store maximum measurements, e.g., in the case of the embodiment depicted in FIGS. 10A-10C, a maximum acceleration experienced by the measurement component 304.

The measurement component 304 is coupled to a biasing mechanism 316 (e.g., a spring or other elastic element) that resists movement of the measurement component 304 in the first rotational direction as depicted by the arrow 314 in FIG. 10B. The biasing mechanism 316 resists an acceleration force imparted on the measurement component 304 as indicated by the "a" and the arrow 314 shown in FIG. 10B. The plurality of teeth A-D, as discussed with respect to FIGS. 5A-5C, are coupled to the detector 80. Like the configuration shown in FIGS. 5A-5C, the measurement component 304 forms a first portion of a plurality of closeable circuits 87, and each of the teeth A-D forms a second portion of the plurality of closeable circuits 87. This configuration allows contact between the distal portion 312 of the measurement component 304 and one of the teeth labeled A-D, as shown in FIG. 10C, to close one of the closeable circuits 87, thereby indicating a maximum achieved acceleration to the detector 80. This measurement can be stored by the MEMS 302 mechanically, as shown in FIG. 10C, and/or can be stored by the RFID component 22. This storage allows for later accessing of the maximum acceleration through a RFID reading and/or scanning process.

FIG. 10B depicts the sensor components 300 of FIG. 10A with the MEMS 302 adjusting in response to a change in conditions, i.e., a change in acceleration imparted on the measurement component 304 of the MEMS 302. FIG. 10C depicts the sensor components 300 after the acceleration force has been imparted to the measurement component 304 of the MEMS 302, such that a new maximum acceleration is indicated and/or stored by the MEMS 302 and/or the RFID component 22. This indication and/or storage of the maximum acceleration is provided through contact between the distal portion 312 of the measurement component 304 and the tooth labeled "A" which completes a circuit 87. This signals to the detector 80 that a maximum acceleration associated with the tooth labeled "A" has been achieved by the MEMS 302.

Referring to an example interaction of the sensor components 300, FIG. 10B depicts an acceleration force being imparted on the measurement component 304 of the MEMS 302. The acceleration force is represented generally by the arrow 314. The acceleration force is applied to the measurement component 304 against an opposing force imparted by the biasing mechanism 316. When an acceleration force sufficient to displace the measurement component 304 past a tooth, e.g., the tooth labeled "A," is imparted, the distal portion 312 advances past the tooth in the first rotational direction as shown in FIG. 10C. The distal portion 316, then making contact with the tooth, e.g., the tooth labeled "A" as shown in FIG. 10C, closes one of the circuits 87 providing a signal to the detector 80 of the current maximum acceleration. This maximum acceleration measurement is stored by the MEMS 302 mechanically through its passive mechanical components as shown in FIG. 10C and/or by the RFID component 22 for later access through a RFID reading and/or scanning process as described herein. Accordingly, a sensor incorporating the sensor components 300 shown in FIGS. 10A-10C can be used to monitor and/or track acceleration (e.g., shock, impact, etc.) experienced by objects with which the sensor is associated, allowing for improved tracking of conditions experienced by those objects. This use of MEMS components allows for relatively small-scale, low-power, and/or passive detection of acceleration in numerous applications.

It should be noted that while many embodiments depicted and described herein incorporate a MEMS to indicate, store, and/or provide measurements of certain encountered conditions, it is contemplated that in any of the embodiments described or contemplated herein, a NEMS and/or components thereof may be used in addition to or in place of the MEMS depicted and described herein to provide similar small-scale, low power, and/or passive monitoring and/or tracking of measured conditions, including with the sensors described herein.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

The present technology has been described in relation to particular embodiments, which are intended in all respects to be illustrative rather than restrictive. Many different arrangements of the various components depicted, as well as use of components not shown, are possible without departing from the spirit and scope of the present disclosure. Alternative aspects will become apparent to those skilled in the art that do not depart from the scope. It will be understood that certain features and sub-combinations are of utility and may be employed without reference to other features and sub-combinations and are contemplated as within the scope of the claims.

What is claimed is:

1. A sensor adapted to provide radio frequency identification ("RFID") of a maximum detected temperature, the sensor comprising:
    a RFID tag;
    a micro-electro-mechanical system (MEMS) and/or a nano-electro-mechanical system (NEMS) that is coupled to the RFID tag, the MEMS and/or NEMS comprising:
        a temperature responsive component,
        a temperature indicating component, and
        a mechanical coupling that couples the temperature responsive component to the temperature indicating component, allowing a physical change in the temperature responsive component to be at least partially translated to the temperature indicating component; and
    a detector communicatively coupled to the RFID tag and configured to detect a change in the temperature indicating component,
    wherein the MEMS and/or the NEMS and/or the RFID tag is configured to store a maximum detected temperature indicated by the temperature indicating component,
    wherein the temperature responsive component comprises:
        a fluid reservoir having a fluid disposed therein,
        a movable piston that at least partially encloses the fluid within the fluid reservoir, and
        a circular gear having a plurality of teeth located about a perimeter of the circular gear, each of the teeth corresponding to a different temperature indication, and
    wherein a change in volume of the fluid caused by a change in temperature of the fluid translates to rotation of the circular gear.

2. The sensor of claim 1, wherein the RFID tag is a passive RFID tag.

3. The sensor of claim 1, wherein the piston and the circular gear are attached through a mechanical coupling comprising an elongated connecting rod having a first end and a second end, the first end movably coupled to the piston and the second end movably coupled to the circular gear.

4. The sensor of claim 3, further comprising a movable lever positioned adjacent to the circular gear, the movable lever coupled to a biasing mechanism, wherein rotation of the circular gear in a first rotational direction allows the plurality of teeth to sequentially move into contact with, and displace, the movable lever.

5. The sensor of claim 4, wherein each one of the plurality of teeth is shaped such that it can displace and move past the movable lever in the first rotational direction but not in an opposite second rotational direction, and wherein the biasing mechanism repositions the movable lever from a displaced position to a resting position after each of the teeth advances past the movable lever in the first rotational direction.

6. The sensor of claim 5, wherein the detector is configured to detect a change in at least one of resistance, capacitance, and inductance as each of the teeth advance past the movable lever in the first rotational direction, and wherein the maximum detected temperature is associated with a number of the teeth that advance past the movable lever in the first rotational direction.

7. A sensor adapted to provide radio frequency identification ("RFID") of a maximum detected temperature, the sensor comprising:
    a RFID tag;
    a micro-electro-mechanical system (MEMS) and/or a nano-electro-mechanical system (NEMS) that is coupled to the RFID tag, the MEMS and/or NEMS comprising:
        a temperature responsive component comprising a bi-material strip that forms a coiled shape, wherein the bi-material strip is formed at least from first and second strips of material having different coefficients of thermal expansion,
        a temperature indicating component, and
        a mechanical coupling that couples the temperature responsive component to the temperature indicating component, allowing a physical change in the temperature responsive component caused by a change in temperature thereof to be at least partially translated to the temperature indicating component; and
    a detector communicatively coupled to the RFID tag and configured to detect a change in the temperature indicating component,
    wherein the MEMS and/or the NEMS and/or the RFID tag stores a maximum detected temperature from the temperature indicating component.

8. The sensor of claim 7, wherein the first strip of material comprises a first metal strip and the second strip of material comprises a second metal strip, and wherein the first and second metal strips are fixedly attached to each other at least proximate corresponding ends of the first metal strip and the second metal strip.

9. The sensor of claim 8, wherein the temperature indicating component comprises a circular gear having a plurality of teeth spaced about a perimeter of the circular gear, wherein a first end of the bi-material strip is coupled to the circular gear proximate a center of the circular gear, and wherein a second end of the bi-material strip is coupled to the circular gear at a location between the center and the perimeter of the circular gear, thereby allowing heating and cooling of the bi-material strip to translate into rotational movement of the circular gear.

10. The sensor of claim 9, further comprising a movable lever coupled to a biasing mechanism, wherein the movable lever is positioned proximate the circular gear, and wherein movement of the circular gear in a first rotational direction caused by a change in temperature of the bi-material strip allows the plurality of teeth to sequentially move into contact with, and displace, the movable lever against a force imparted by the biasing mechanism.

11. The sensor of claim 10, wherein each one of the plurality of teeth is shaped such that it can displace and move past the movable lever in the first rotational direction but not in an opposite second rotational direction, and wherein the biasing mechanism repositions the movable lever from a displaced position to a resting position after each one of the plurality of teeth advances past the movable lever in the first rotational direction.

12. The sensor of claim 11, wherein the detector is configured to detect a change in at least one of resistance, capacitance, and inductance as each of the teeth advance past the movable lever in the first rotational direction, and wherein the maximum detected temperature is associated with a number of the teeth that advance past the movable lever in the first rotational direction.

13. A sensor adapted to provide radio frequency identification ("RFID") of a maximum detected temperature, the sensor comprising:
a RFID tag;
a micro-electro-mechanical system (MEMS) and/or a nano-electro-mechanical system (NEMS) that is coupled to the RFID tag, the MEMS and/or NEMS comprising:
a temperature responsive component comprising a bi-material strip, wherein the bi-material strip is formed at least from first and second strips of material having different coefficients of thermal expansion, wherein the bi-material strip pivots about a pivotal coupling,
a temperature indicating component comprising a plurality of measurement indicators, and
a detector communicatively coupled to the RFID tag and configured to detect when the temperature responsive component is in contact with one of the plurality of measurement indicators,
wherein the MEMS and/or the NEMS and/or the RFID tag is configured to store a maximum detected temperature from the temperature indicating component,
wherein the temperature indicating component comprises a curved surface extending at least partially about the pivotal coupling,
wherein the plurality of measurement indicators comprise a plurality of teeth positioned along the curved surface to face toward the pivotal coupling, and
wherein, when the temperature of the bi-material strip increases, a distal portion of the bi-material strip moves in a first rotational direction into sequential contact with the plurality of teeth.

14. The sensor of claim 13, wherein the movement of the bi-material strip in response to the increase in temperature occurs while the plurality of teeth remain in fixed position relative to the pivotal coupling.

15. The sensor of claim 14, wherein the plurality of teeth are shaped such that the distal portion of the bi-material strip can move into contact with and advance past each of the teeth in the first rotational direction but not in an opposite second rotational direction.

16. The sensor of claim 15, wherein the detector comprises a plurality of closeable circuits, wherein the bi-material strip forms a first portion of the plurality of closeable circuits, and wherein each of the teeth form a respective second portion of the plurality of closeable circuits, such that when the distal portion of the bi-material strip is in contact with one of the teeth, a corresponding one of the plurality of closeable circuits is completed indicating a temperature of the temperature responsive component.

17. The sensor of claim 16, wherein the maximum detected temperature stored by the MEMS and/or the NEMS and/or the RFID tag corresponds to a closed circuit that is associated with the highest temperature of the temperature responsive component.

18. The sensor of claim 13, wherein the maximum detected temperature is stored in the MEMS.

19. The sensor of claim 13, wherein the maximum detected temperature is stored in the NEMS.

20. The sensor of claim 13, wherein the maximum detected temperature is stored in the RFID tag.

* * * * *